B. E. D. STAFFORD.
FLEXIBLE STAY BOLT FOR BOILERS.
APPLICATION FILED DEC. 13, 1911.
1,042,831.
Patented Oct. 29, 1912.
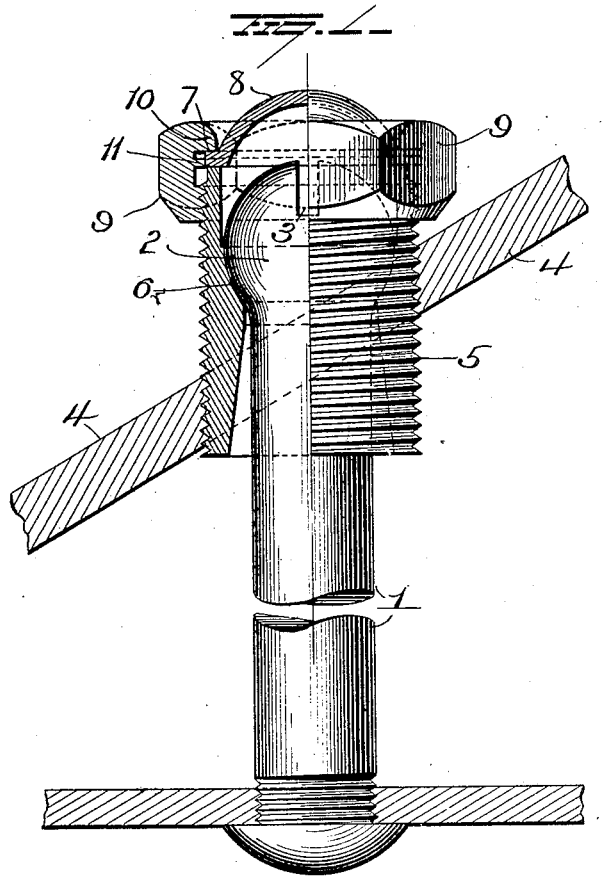
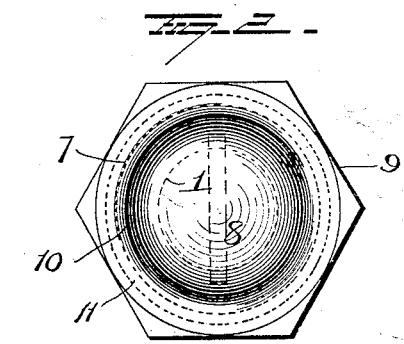

UNITED STATES PATENT OFFICE.

BENJAMIN E. D. STAFFORD, OF PITTSBURGH, PENNSYLVANIA, ASSIGNOR TO FLANNERY BOLT COMPANY, OF PITTSBURGH, PENNSYLVANIA.

FLEXIBLE STAY-BOLT FOR BOILERS.

1,042,831.   Specification of Letters Patent.   Patented Oct. 29, 1912.

Application filed December 13, 1911. Serial No. 665,504.

*To all whom it may concern:*

Be it known that I, BENJAMIN E. D. STAFFORD, of Pittsburgh, in the county of Allegheny and State of Pennsylvania, have invented certain new and useful Improvements in Flexible Stay-Bolts for Boilers; and I do hereby declare the following to be a full, clear, and exact description of the invention, such as will enable others skilled in the art to which it appertains to make and use the same.

My invention relates to an improvement in flexible stay bolts for boilers, the object being to provide simple and effective means for forming a steam tight joint at the outer end of the bolt, and it consists in the parts and combinations of parts as will be more fully explained and pointed out in the claims.

In the accompanying drawings, Figure 1 is a view partly in section and partly in elevation of the bolt as applied to the inner and outer sheets of a boiler, and Fig. 2 is a view in plan.

In constructing a stay bolt in accordance with my invention, I provide a bolt 1 having a substantially spherical head 2 at one end and threaded at the opposite end the head 2 being provided with a slot 3 for the engagement of a suitable driver. Secured within the outer sheet 4 of the boiler, is the sleeve or bushing 5, threaded externally. The inner end of this bushing has a bore or opening of greater diameter than the diameter of the body of the bolt 1, and is made flaring, so as to permit of a free lateral or rocking movement of the bolt within reasonable limits. This bushing is designed to receive the head 2 of the bolt 1 and house the same, and is provided internally with a seat 6, formed preferably in the arc of a circle concentric with the head 2 of the bolt, thus permitting of a universal movement of the head on its seat during the expansion and contraction of the sheets to which the bolt is connected.

The cavity within the sleeve or bushing 5 and above the seat 6, is of a size sufficient for the free entrance of the head, and the outer end of said bushing is provided with a ridge or seat upon which the flanged edge 7 of the soft metal cap 8 is seated. This cap is preferably concave on its inner face, the concavity being on an arc concentric with the head 2, and sufficiently removed from the latter to afford ample clearance for the movements of the bolt head during the expansion of the sheets, and is preferably made of copper or a copper composition stamped or otherwise formed into substantially the shape shown so as to form a closure for the outer end of the sleeve or bushing. This cap 8 is held in place by the nut 9, which latter is internally threaded at its lower end to engage the external threads on the sleeve or bushing and is provided at its upper end with an inwardly projecting lip or flange 10 which overlaps the base flange or rim 7 of the cap 8 and holds same securely on the upper smooth, (and ground if necessary) end of the sleeve or bushing. This nut is also provided at a point intermediate its internal threads, and its lip or flange 10, with an annular rib 11, which latter approximately fits the outer edge of the lip or flange 7 and when the parts are assembled, as shown in Fig. 1, forms an abutment for said lip or flange 7 and prevents the same from spreading or expanding outwardly under the crushing power of the nut.

The cap 8 forms a closure and packing for the bushing 5, and dispenses with the use of a copper washer or gasket which, at times, is necessarily used between the sleeve or bushing and the steel cap in order to provide a steam tight joint. With the copper or soft metal cap the part thereof under compression will give or yield and thus conform itself to the clamping edges of the sleeve or bushing and the steel nut which may be forged or cast, and form a steam tight joint.

Inspection of flexible stay bolts necessitates the periodical removal of the caps from the sleeves or bushings in order to get at and inspect the stay bolt proper. By making the cap of a comparatively soft metal or alloy, I expedite the handling of parts and obtain steam tight fits without the use of gaskets which are liable to be lost or mislaid or crushed so as to be practically worthless as a packing. Again, the cap 8 is of sufficient strength to support the head 2 of the bolt against normal strains when the sheets are expanded but will give way under excessive stresses and thus prevent the sleeve or bushing from being dislodged and the boiler seriously injured.

It is evident that many slight changes might be resorted to in the relative arrangement of parts shown and described without departing from the spirit and scope of the claims annexed. Hence I would have it understood that I do not wish to confine myself except as required by the scope of said claims to the exact construction and arrangement of parts shown and described, but, Having fully described my invention what I claim as new and desire to secure by Letters-Patent, is:—

1. A stay bolt structure comprising a bolt having a head, a sleeve or bushing having an internal seat for the head of the bolt, a soft metal cap forming a closure for the sleeve or bushing, and a nut for locking the cap to the bushing.

2. A stay bolt structure comprising a bolt having a head, a sleeve or bushing having an internal seat for said head, a soft metal cap seated on the outer end of the bushing and forming a closure for the latter and a nut engaging said cap and sleeve or bushing for locking the cap in place.

3. A stay bolt structure comprising a bolt having a head, a sleeve or bushing having an internal seat for said head, a soft metal cap having a base flange or rim adapted to rest on the outer end of the bushing and a nut screwed onto the sleeve or bushing and provided with a lip overlapping the base flange or rim of the cap.

4. A stay bolt structure comprising a bolt having a head, a sleeve or bushing having an internal seat for said head, a soft metal cap resting on the outer end of the sleeve or bushing and forming a closure for the latter, and a nut screwed onto the sleeve or bushing and provided with a lip overlapping the outer edge of the cap, and with an annular shoulder forming an abutment for the edge of the cap to limit the expansion of the latter.

5. A stay bolt structure comprising a bolt having a head, a sleeve or bushing having an internal seat for said head, a soft metal cap concave on its inner side and provided with a base flange or rim resting on the outer end of the sleeve or bushing and forming a closure for the latter, and a nut screwed to the sleeve or bushing and having an annular lip overlapping the base flange or rim of the cap.

6. A stay bolt structure comprising a bolt having a head, a sleeve or bushing having an internal seat for said head and also provided with a ridge at its upper end, a soft metal cap resting on said ridge and a nut screwed to the sleeve or bushing and provided with an annular lip resting on the rim of the cap, the said nut overhanging the cap within the plane of the lip.

In testimony whereof, I have signed this specification in the presence of two subscribing witnesses.

BENJAMIN E. D. STAFFORD.

Witnesses:
  EDWIN SPENCER RYCE,
  WM. L. MCNABB.